(12) United States Patent
Steffenhagen et al.

(10) Patent No.: US 12,018,994 B2
(45) Date of Patent: Jun. 25, 2024

(54) CHAIN WEAR SENSOR

(71) Applicant: NOV INTERVENTION AND STIMULATION EQUIPMENT US, LLC, Houston, TX (US)

(72) Inventors: Timothy Scott Steffenhagen, Fort Worth, TX (US); Marcus Joseph Doran, Arlington, TX (US); Kenneth Gene Barnes, Conroe, TX (US)

(73) Assignee: NOV INTERVENTION AND STIMULATION EQUIPMENT US, LLC

(*) Notice: Subject to any disclaimer, the term of this patent is extended or adjusted under 35 U.S.C. 154(b) by 327 days.

(21) Appl. No.: 17/594,823

(22) PCT Filed: Apr. 30, 2020

(86) PCT No.: PCT/US2020/030755
§ 371 (c)(1),
(2) Date: Oct. 29, 2021

(87) PCT Pub. No.: WO2020/223502
PCT Pub. Date: Nov. 5, 2020

(65) Prior Publication Data
US 2022/0205867 A1 Jun. 30, 2022

Related U.S. Application Data

(60) Provisional application No. 62/841,618, filed on May 1, 2019.

(51) Int. Cl.
*G01M 13/00* (2019.01)
*E21B 19/22* (2006.01)
*G08B 21/18* (2006.01)

(52) U.S. Cl.
CPC ............ *G01M 13/00* (2013.01); *E21B 19/22* (2013.01); *G08B 21/182* (2013.01)

(58) Field of Classification Search
CPC ...... G01M 13/00; E21B 19/22; G08B 21/182; B65G 43/02
See application file for complete search history.

(56) References Cited

U.S. PATENT DOCUMENTS

| 4,585,061 A | 4/1986 | Lyons, Jr. et al. |
| 5,029,642 A | 7/1991 | Crawford |

(Continued)

FOREIGN PATENT DOCUMENTS

| CA | 3017404 | 3/2019 |
| CA | 3017404 C | 1/2024 |

(Continued)

OTHER PUBLICATIONS

"Saudi Arabian Application Serial No. 521430729, Substantive Examination Report mailed Dec. 28, 2022", w English translation, 11 pgs.

(Continued)

*Primary Examiner* — Suman K Nath
(74) *Attorney, Agent, or Firm* — Schwegman Lundberg & Woessner, P.A.

(57) ABSTRACT

A chain wear system for monitoring an amount of wear of a chain operating on a plurality of sprockets may include a chain monitoring device configured for determining a length of the chain passing by a point in an amount of time, a sprocket monitoring device configured for determining the amount of sprocket rotation of at least one of the plurality of sprockets in the amount of time, and a processing system in signal communication with the chain monitoring device and the sprocket monitoring device. The processing system may (Continued)

be configured for calculating the amount of wear based on the length of the chain and the amount of sprocket rotation.

18 Claims, 11 Drawing Sheets

(56) References Cited

U.S. PATENT DOCUMENTS

| | | | |
|---|---|---|---|
| 5,799,731 | A | 9/1998 | Avakov et al. |
| 5,845,708 | A | 12/1998 | Burge et al. |
| 6,158,516 | A | 12/2000 | Smith et al. |
| 6,216,780 | B1 | 4/2001 | Goode et al. |
| 6,681,614 | B1 | 1/2004 | Riffe |
| 7,036,578 | B2 | 5/2006 | Austbo et al. |
| 7,708,058 | B1 | 5/2010 | Gipson |
| 9,464,493 | B2 | 10/2016 | Andreychuk et al. |
| 9,631,699 | B2* | 4/2017 | Dietrich ............... F16G 13/04 |
| 10,975,634 | B2 | 4/2021 | Doran et al. |
| 11,359,446 | B2 | 6/2022 | Steffenhagen et al. |
| 11,608,695 | B2 | 3/2023 | Steffenhagen et al. |
| 2003/0209346 | A1 | 11/2003 | Austbo et al. |
| 2004/0211555 | A1 | 10/2004 | Austbo et al. |
| 2006/0096754 | A1 | 5/2006 | Weightmann |
| 2006/0163415 | A1 | 7/2006 | Geddes et al. |
| 2008/0173480 | A1 | 7/2008 | Annaiyappa et al. |
| 2008/0314580 | A1 | 12/2008 | Wood |
| 2012/0085531 | A1 | 4/2012 | Leising et al. |
| 2013/0048270 | A1 | 2/2013 | Havinga et al. |
| 2014/0000867 | A1 | 1/2014 | Andreychuk et al. |
| 2014/0174194 | A1 | 6/2014 | Wu |
| 2015/0101799 | A1 | 4/2015 | Steffenhagen et al. |
| 2015/0144357 | A1 | 5/2015 | Hampson et al. |
| 2016/0138347 | A1 | 5/2016 | Bjornenak |
| 2016/0369614 | A1 | 12/2016 | Turner et al. |
| 2017/0006878 | A1 | 1/2017 | Domenicucci et al. |
| 2017/0260835 | A1 | 9/2017 | Crawford et al. |
| 2018/0320502 | A1 | 11/2018 | Turner et al. |
| 2019/0062068 | A1 | 2/2019 | Kreisfeld et al. |
| 2019/0085646 | A1 | 3/2019 | Doran et al. |
| 2021/0207445 | A1 | 7/2021 | Steffenhagen et al. |
| 2021/0348459 | A1 | 11/2021 | Steffenhagen et al. |

FOREIGN PATENT DOCUMENTS

| | | |
|---|---|---|
| GB | 2229208 | 9/1990 |
| GB | 2568154 | 5/2019 |
| SG | 10201808078 W | 4/2019 |
| WO | 2009044117 | 4/2009 |
| WO | 2015076775 | 5/2015 |
| WO | 2017105411 | 6/2017 |
| WO | 2020060998 | 3/2020 |
| WO | 2020131621 | 6/2020 |
| WO | 2020223502 | 11/2020 |

OTHER PUBLICATIONS

"European Application Serial No. 19863465.1, Response Filed Nov. 2, 2022 to Extended European Search Report mailed Apr. 19, 2022", 13 pgs.
"U.S. Appl. No. 17/250,799, Notice of Allowance mailed Nov. 28, 2022", 5 pgs.
"European Application Serial No. 19836388.9, Communication Pursuant to Article 94(3) EPC mailed Jan. 18, 2022", 4 pgs.
"U.S. Appl. No. 17/309,767, Response filed Jan. 20, 2022 to Non-Final Office Action mailed Oct. 22, 2021", 7 pgs.
"U.S. Appl. No. 17/309,767, Notice of Allowance mailed Feb. 16, 2022", 5 pgs.
"European Application Serial No. 19836388.9, Response filed Feb. 14, 2022 to Communication Pursuant to Article 94(3) EPC mailed Jan. 18, 2022", 13 pgs.
"United Kingdom Application Serial No. 1815273.6, Search Report mailed Feb. 28, 2019", 6 pgs.
"United Kingdom Application Serial No. 1815273.6, Response filed Sep. 17, 2019 to Search Report mailed Feb. 28, 2019", 21 pgs.
"International Application Serial No. PCT US2019 051443, International Search Report mailed Nov. 13, 2019", 2 pgs.
"International Application Serial No. PCT US2019 051443, Written Opinion mailed Nov. 13, 2019", 5 pgs.
"U.S. Appl. No. 16/131,291, Non Final Office Action mailed Apr. 6, 2020", 11 pgs.
"International Application Serial No. PCT US2019 066238, International Search Report mailed Mar. 25, 2020", 5 pgs.
"International Application Serial No. PCT US2019 066238, Written Opinion mailed Mar. 25, 2020", 5 pgs.
"U.S. Appl. No. 16/131,291, Response filed Jul. 6, 2020 to Non Final Office Action mailed Apr. 6, 2020", 10 pgs.
"International Application Serial No. PCT US2020 030755, International Search Report mailed Aug. 4, 2020", 2 pgs.
"International Application Serial No. PCT US2020 030755, Written Opinion mailed Aug. 4, 2020", 7 pgs.
"U.S. Appl. No. 16/131,291, Final Office Action mailed Aug. 10, 2020", 9 pgs.
"U.S. Appl. No. 16/131,291, Examiner Interview Summary mailed Sep. 28, 2020", 3 pgs.
"U.S. Appl. No. 16/131,291, Response filed Nov. 9, 2020 to Final Office Action mailed Aug. 10, 2020", 7 pgs.
"U.S. Appl. No. 16/131,291, Notice of Allowance mailed Dec. 14, 2020", 6 pgs.
"International Application Serial No. PCT US2019 051443, International Preliminary Report on Patentability mailed Mar. 25, 2021", 7 pgs.
"International Application Serial No. PCT US2020 030755, International Preliminary Report on Patentability mailed May 18, 2021", 8 pgs.
"International Application Serial No. PCT US2019 066238, International Preliminary Report on Patentability mailed Jul. 1, 2021", 7 pgs.
"U.S. Appl. No. 17/309,767, Non Final Office Action mailed Oct. 22, 2021", 5 pgs.
U.S. Appl. No. 16/131,291 U.S. Pat. No. 10,975,634, filed Sep. 14, 2018, Tubing Guide Stabilization.
U.S. Appl. No. 17/250,799, filed Mar. 4, 2021, Injector Remote Tubing Guide Alignment Device.
U.S. Appl. No. 17/309,767, filed Jun. 17, 2021, Coiled Tubing Injector With Gripper Shoe Carrier Position Monitor.
"U.S. Appl. No. 17/250,799, Non Final Office Action mailed Mar. 17, 2022", 12 pgs.
"European Application Serial No. 19863465.1, Extended European Search Report mailed Apr. 19, 2022", 8 pgs.
"U.S. Appl. No. 17/250,799, Response filed May 18, 2022 to Non Final Office Action mailed Mar. 17, 2022", 8 pgs.
"U.S. Appl. No. 17/250,799, Final Office Action mailed Jun. 3, 2022", 5 pgs.
"U.S. Appl. No. 17/250,799, Examiner Interview Summary mailed Jul. 11, 2022", 3 pgs.
"U.S. Appl. No. 17/250,799, Response filed Jul. 19, 2022 to Final Office Action mailed Jun. 3, 2022", 9 pgs.
"U.S. Appl. No. 17/250,799, Notice of Allowance mailed Aug. 11, 2022", 8 pgs.
"Saudi Arabia Application No. 521421468, Office Action Mailed Aug. 31, 2022", w o English translation, 8 pgs.
"Canadian Application Serial No. 3122703, Voluntary Amendment Filed Jan. 3, 2024", 23 pgs.

* cited by examiner

CHAIN WEAR SENSOR

CLAIM OF PRIORITY

This patent application is a U.S. National Stage Filing under 35 U.S.C. 371 from International Application No. PCT/US2020/030755, filed, Apr. 30, 2020, and published as WO 2020/223502, which claims the benefit of priority to U.S. Provisional Application Ser. No. 62/841,618, filed May 1, 2019, each of which are incorporated by reference herein in their entirety.

TECHNOLOGICAL FIELD

The present disclosure relates to assessing chain wear. More particularly, the present disclosure relates to dynamically assessing chain wear on operating equipment. Still more particularly, the present disclosure relates to dynamically assessing chain wear in a coiled tubing injector.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Chain wear is often measured directly by measuring particular lengths of chain and comparing the measured length to a nominal or starting length of chain. The wear of a chain can cause the chain to lengthen or "stretch" and at particular amounts of stretch (i.e., 2-3%), chains may be taken out of service depending on applicable regulations, for example. As such, the physical measurement may allow for determining whether the chain may remain in service or whether replacement is needed. In order to physically measure a chain directly, the equipment it is operating on may be shutdown to stop the motion of the chain. In some cases, the chain may be removed from the equipment to allow it to be measured. This can create large amounts of downtime and the timing of such measurements may not always be convenient when the measurements cannot be timed for natural downtime, for example. Avoiding downtime may be desirable in many contexts. One particular context is when delivering or removing coiled tubing to or from a well with a coiled tubing injector.

Coiled tubing refers to a continuous string of pipe coiled on a take-up reel for transportation and handling. Coiled tubing may be used in a wide range of oilfield services and operations throughout the life of a well. A coiled tubing unit may be a mobile or stationary vehicle or structure for performing coiled tubing operations at a well. A coiled tubing unit may often have a coiled tubing injector. The injector may drive or guide the tubing into a well for performing various oilfield services or operations. The coiled tubing unit may additionally have a coiled tubing guide, which may generally direct the tubing, as it is spooled onto or unspooled from a reel and as it exits the injector or enters the injector, respectively. In general, the guide may help to mitigate bends or kinks in the continuous tubing before it is fed into the injector and may be used to control alignment of the tubing as it enters the injector.

As the coiled tubing enters the injector it may be grasped by the injector and, more particularly, by shoes mounted on spaced apart chain assemblies. That is, the injector may include two chain assemblies that may be adjusted by a traction system to control the amount of space between the two chain assemblies and, as such, control engagement with each side of the coiled tubing. The traction system may, thus, cause the chain shoes carried by the chain to frictionally engage the coiled tubing. Each chain assembly may advance at substantially equal rates to advance the coiled tubing through the injector.

Over time, the chains of the chain assemblies on each side of the coiled tubing path may experience wear. When the chains experience excessive wear, they can cause damage to the sprockets driving them, they can be at risk of failure, and other problems may occur. Moreover, particular regulations may require removal or replacement of the chain at particular wear values. As mentioned, current methods for monitoring and/or measuring chain wear often involve shutdown and/or removal of the chain for wear measurements. This is undesirable in many contexts, but particularly in the context of a coiled tubing injector which may be running thousands of feet of tubing into and/or out of a well for performing particular well operations and interruptions of this process can be time consuming and costly.

SUMMARY

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

In one or more embodiments, a chain wear system for monitoring an amount of wear of a chain operating on a plurality of sprockets may include a chain monitoring device configured for determining a length of the chain passing by a point in an amount of time. The system may also include a sprocket monitoring device configured for determining the amount of sprocket rotation of at least one of the plurality of sprockets in the amount of time. The system may further include a processing system in signal communication with the chain monitoring device and the sprocket monitoring device and configured for calculating the amount of wear based on the length of the chain and the amount of sprocket rotation.

In one or more embodiments, a chain wear system for monitoring an amount of wear of a chain operating on a plurality of sprockets may include a chain monitoring device configured for determining a length of the chain passing by a point in an amount of time. The system may also include a pitch counter configured for determining a number of pitches passing by a point in the amount of time. The system may also include a processing system in signal communication with the chain monitoring device and the pitch counter and configured for calculating the amount of wear based on the length of the chain and the number of pitches.

In one or more embodiments, a coiled tubing unit may include a transportation vehicle with a tubing spool containing coiled tubing. The unit may also include a coiled tubing injector configured for pulling the coiled tubing from the spool and injecting it into a well. The coiled tubing injector may include a driven chain assembly and the coiled tubing injector may be equipped with a chain wear system configured to dynamically determine an amount of chain wear during operation of the coiled tubing injector.

In one or more embodiments, a method for dynamically determining an amount of wear of a chain may include determining a length of chain passing by a point in an amount of time. The method may also include determining an amount of sprocket rotation in the amount of time. The method may also include calculating the amount of wear based on the length of chain and the amount of sprocket rotation.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in one or more embodiments, relates to systems and methods for dynamically measuring and/or monitoring chain wear. In the case of a coiled tubing injector, the method includes monitoring the amount of travel of the coiled tubing being run through the injector. The method also includes monitoring a quantity of chain pitches for a given length of tubing travel based on the number of sprocket teeth rotating to drive the chain. This approach may allow for determining a chain pitch length that may be compared to a nominal chain pitch length to determine the amount of wear that has occurred. This approach allows the chain wear of the injector to be monitored without disassembling the machine and while the machine is in operation. Chain wear can, thus, be actively monitored and interruptions in use for purposes of maintenance and/or repair can be anticipated and planned for.

It is to be appreciated that the presently described system for assessing chain wear may be used in several different contexts. For purposes of discussion, the present chain wear system may be described in the context of a coiled tubing injector.

Figure 1:
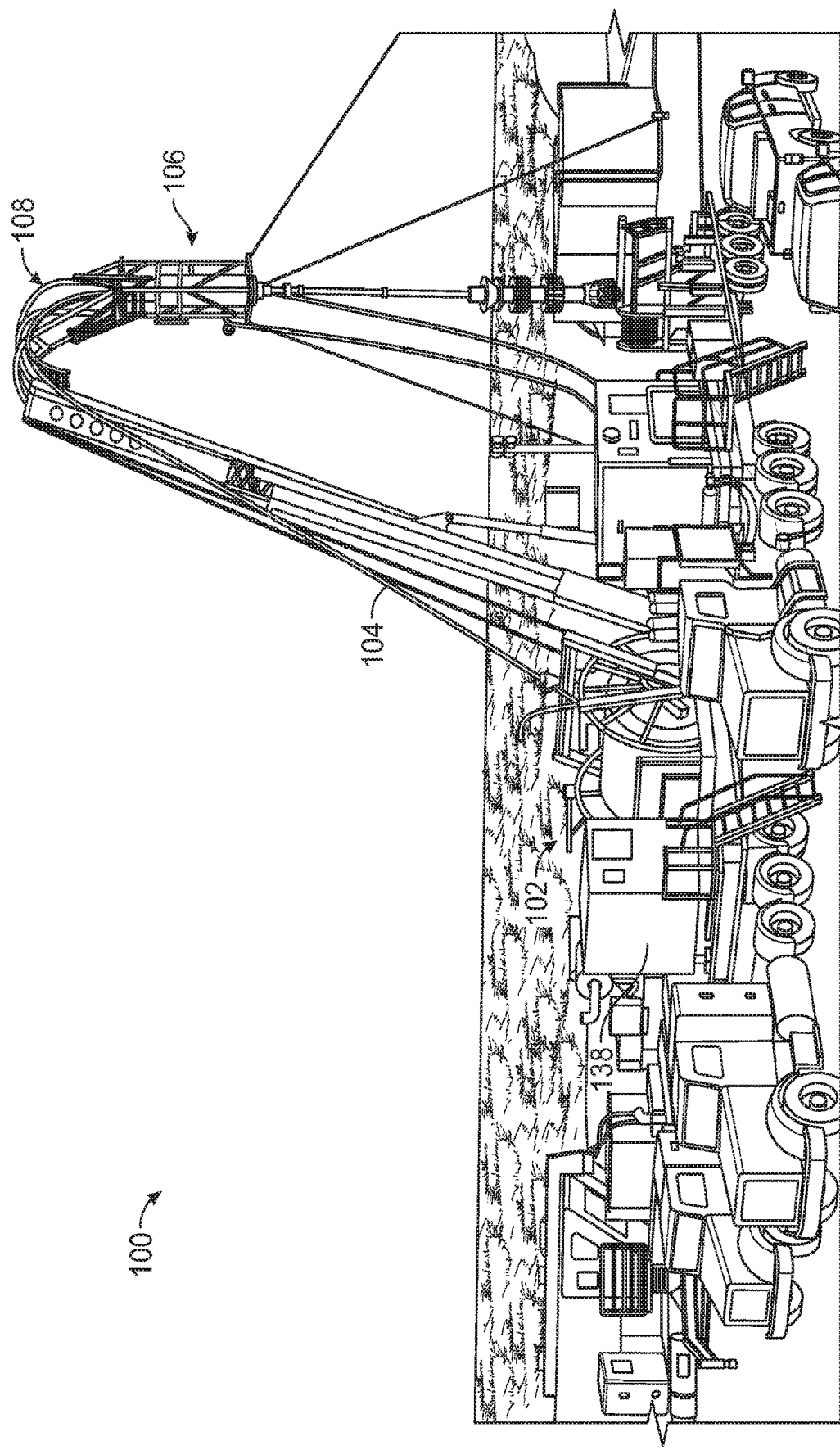
FIG. 1 is a perspective view of a coiled tubing unit in position on a well pad, according to one or more embodiments.

As shown in FIG. 1, a coiled tubing unit 100 may include one or more transportation vehicles with a tubing spool 102 containing a very high linear footage of coiled tubing 104. The unit 100 may also include a coiled tubing injector 106 for advancing the tubing 104 into a well and a coiled tubing guide 108 for guiding the tubing from the spool and into the injector. In one or more embodiments, the injector and the guide may be supported by a crane and suspended above a well allowing the injector to pull the tubing from the spool and through the guide and advance the tubing into the well.

Figure 3:
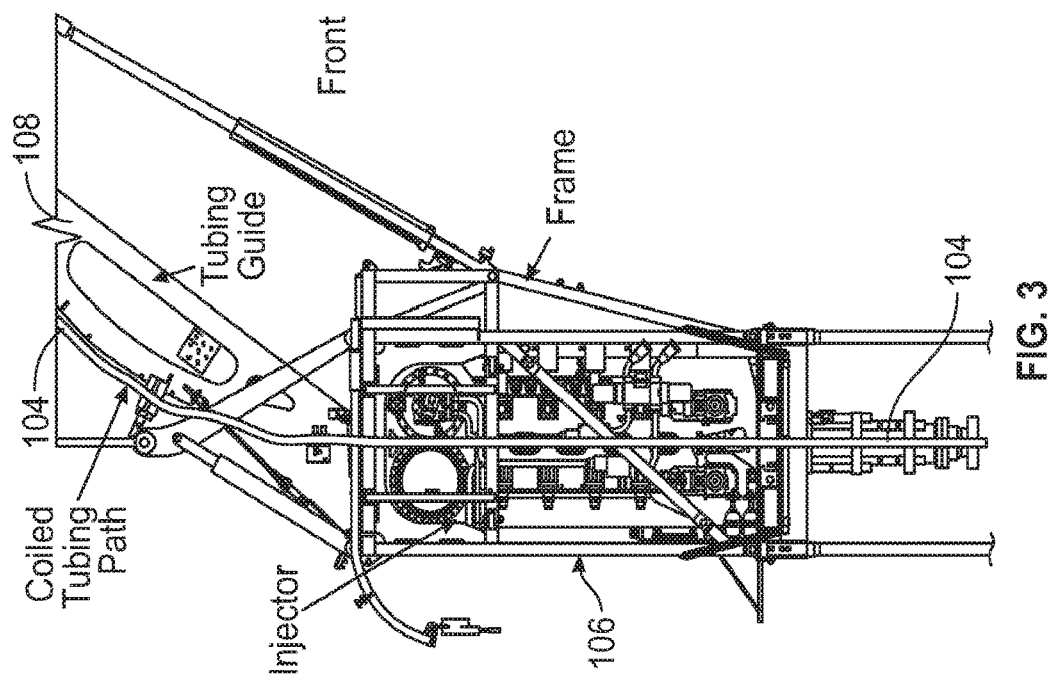
FIG. 3 is a close-up side view of an injector with a coiled tubing passing therethrough, according to one or more embodiments.
Figure 2:
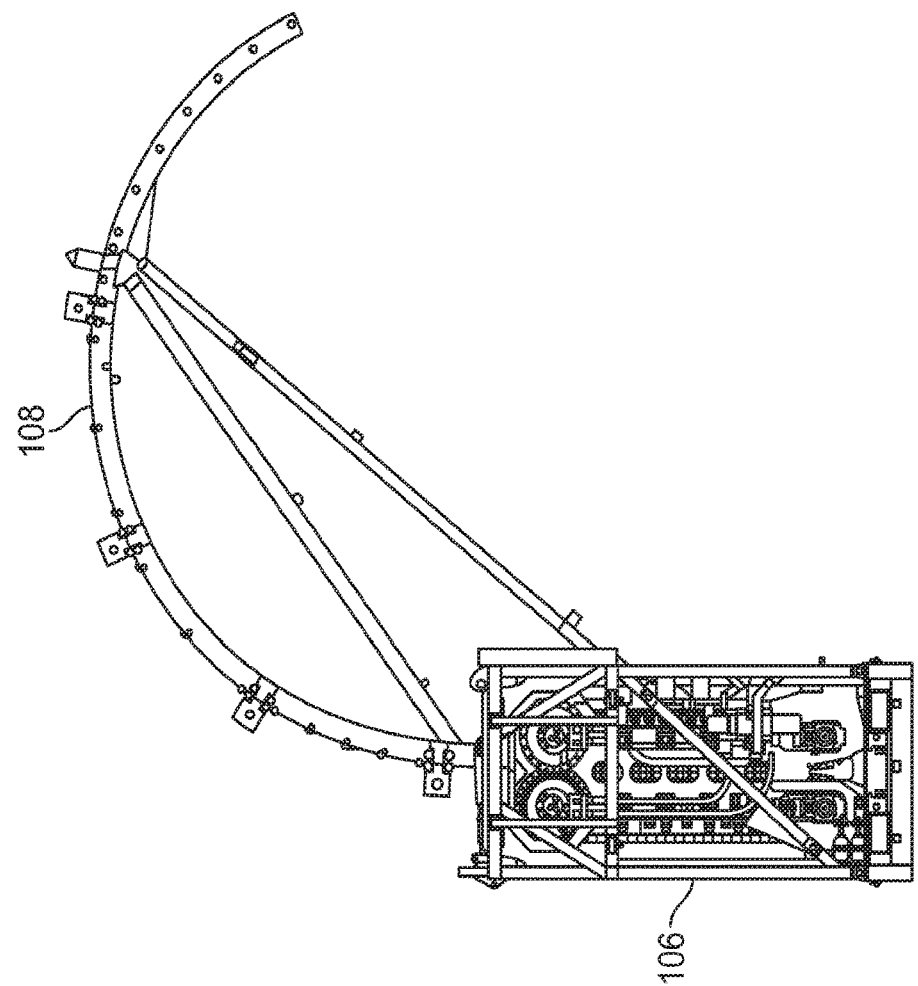
FIG. 2 is a side view of a coiled tubing guide coupled to a coiled tubing injector frame, according to one or more embodiments.

FIG. 2 is a side view of a tubing guide 108 in position on a tubing injector 106. As shown, the tubing guide 108 may be an arcuate structure configured for guiding the tubing 104 off of the spool 102 and into the injector 106. The injector 106 may be arranged within a frame and the tubing guide may be mounted on the frame. As shown in a closer view in FIGS. 3 and 4, the tubing guide may be secured to the frame of the injector to align the incoming tubing with a tubing path between a pair of chain assemblies 112 within the injector allowing the chain assemblies to engage and advance the tubing.

Figure 4:
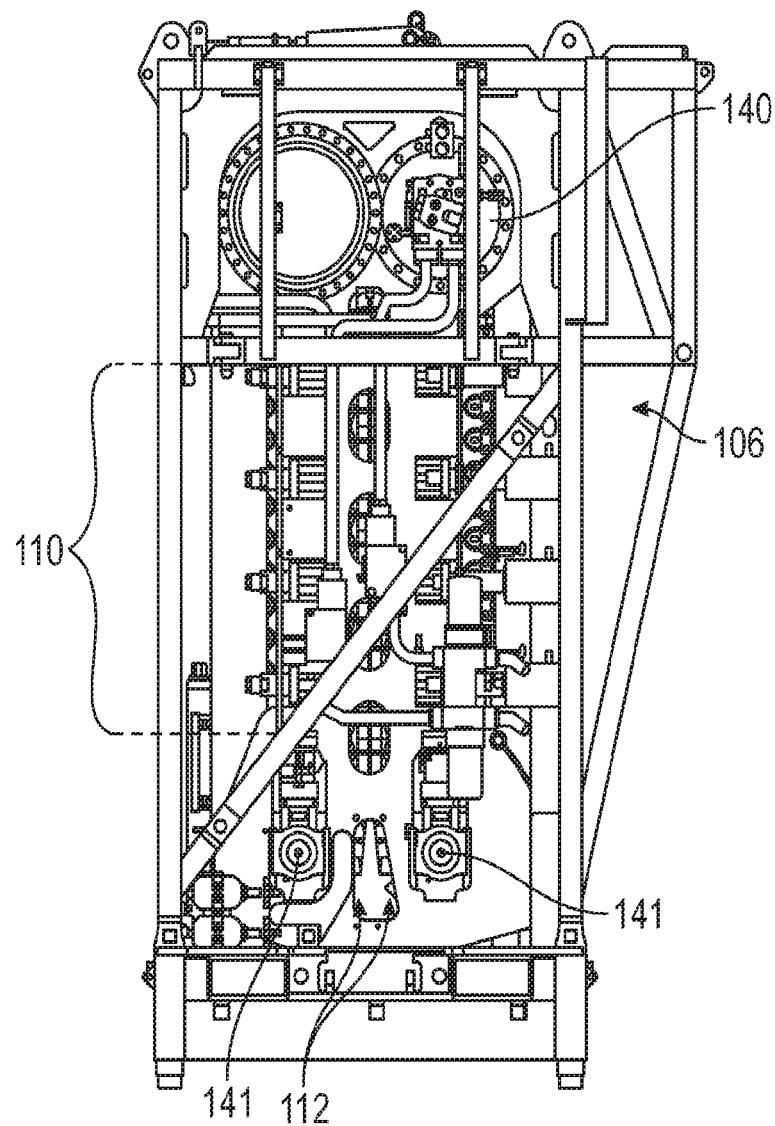
FIG. 4 is a close-up side view of injector components, according to one or more embodiments.

FIG. 4 shows a close-up side view of an injector 106. The injector 106 may include a pair of chain assemblies 112 for gripping the coiled tubing and drawing or advancing the coiled tubing through the injector. The chain assemblies 112 may include shoes that engage the tubing from each side and move with the tubing through the injector.

Figure 6:
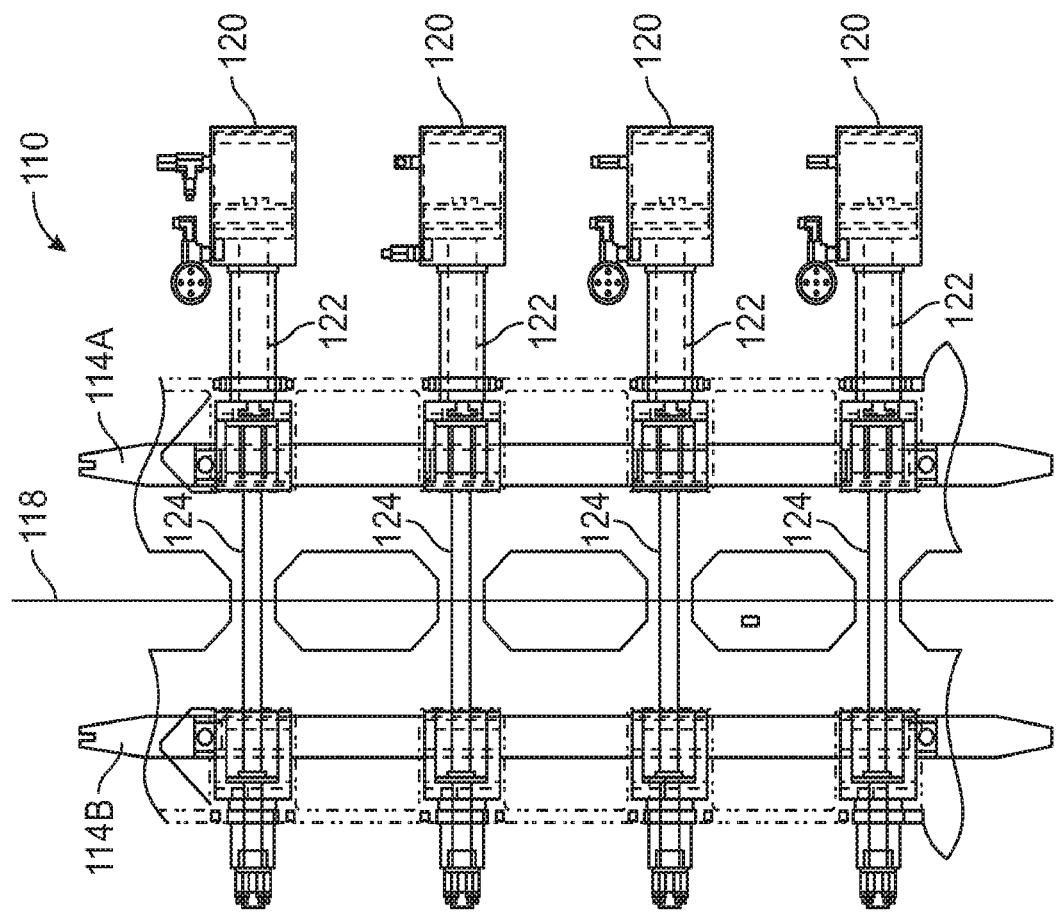
FIG. 6 is a side view of a traction system, according to one or more embodiments.
Figure 5:
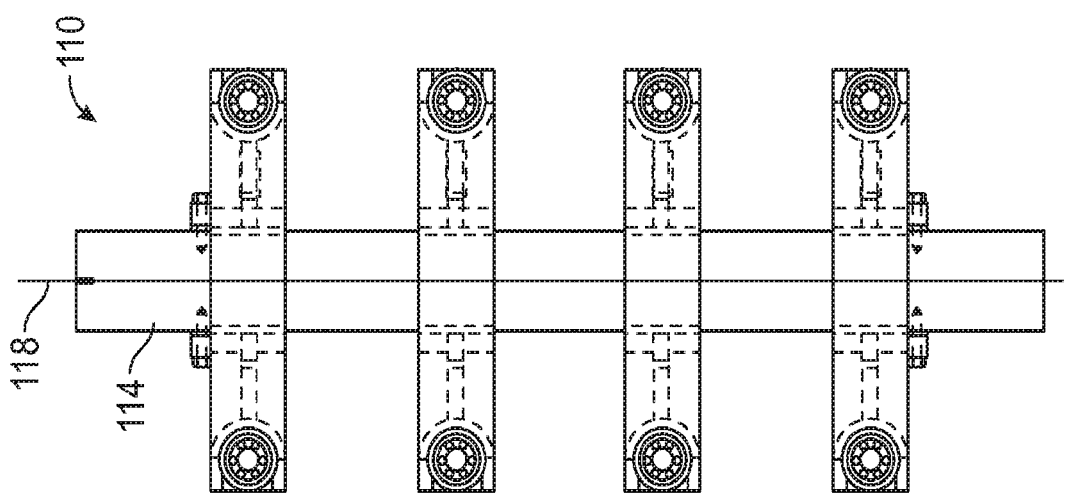
FIG. 5 is a front view of a traction system, according to one or more embodiments.
Figure 7:
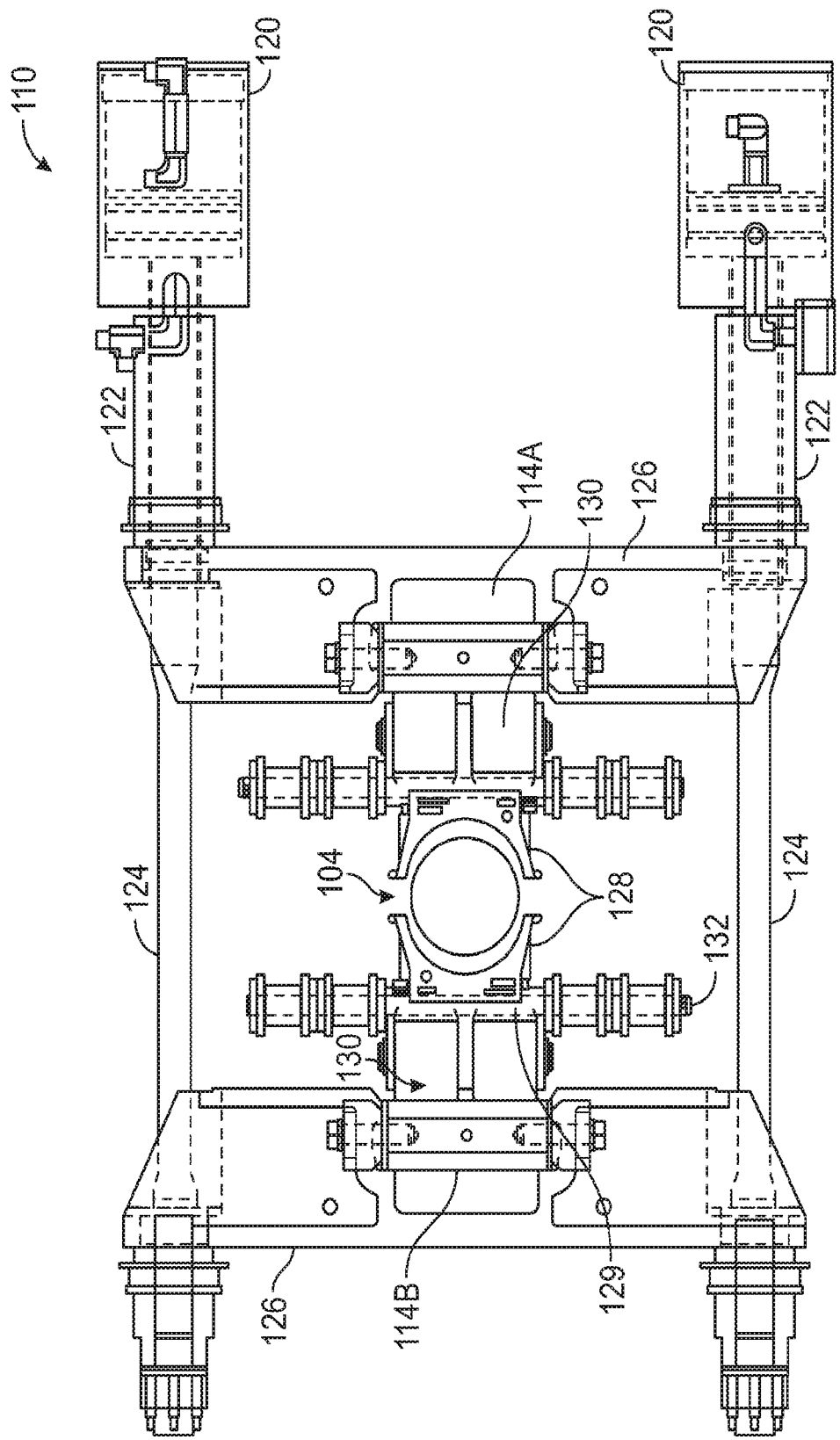
FIG. 7 is a top down view of a traction system and chain assembly, according to one or more embodiments.

FIG. 5 shows an internal front view of a traction system 110 of the injector 106. The traction system 110 may be a system for controlling the spacing between the chain assemblies 112 to thereby control the engagement of the chain assemblies 112 with each side of the tubing 104. In FIG. 5, several portions of the injector have been removed or omitted to reveal a portion of the traction system called a skate, track, or vertically extending guide 114. The traction system 110 may include a vertically extending guide 114 on either side of the coiled tubing. The guide 114 may be configured for rolling or sliding engagement by the chain assembly 112 and for controlling the space between the chain assemblies 112. That is, one or both guides on each side of the traction system may be adjustable to increase or decrease the space between them to cause the shoes of the chain assembly to suitably engage the coiled tubing. As shown in FIG. 6, the guides 114 may be mounted on opposing sides of the coiled tubing path 118 and may be adjustable by one or more hydraulic cylinders, screw drives, or other telescoping or other longitudinally adjustable actuation devices 120. A first guide 114A may be held in position by a collar or standoff 122 defining a distance from the actuation device 120 to the first guide 114A. The second guide 114B may be on an opposite side of the tubing path 118 and may have an adjustable position based on a rod 124 extending or retracting from the actuation device 120. A top down view of the system may be seen in FIG. 7. As shown, the guides 114A/B on each side of the tubing path 118 may be arranged on a beam 126, which spans between a pair of rods 124 extending from respective actuation devices 120. The extension or retraction of the rods 124 by the actuation devices 120 may move the beams 126 further away from or closer to each other and, accordingly, move the guides further away from or closer to each other. In this manner, the amount of clamping force of the traction system 110 on the tubing 104 may be adjusted or controlled.

Figure 8:
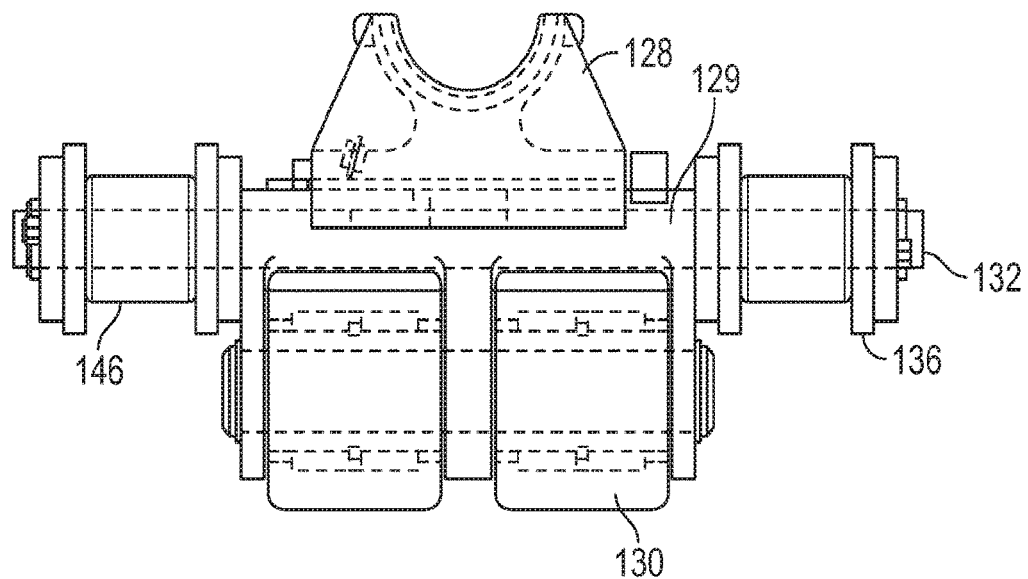
FIG. 8 is a close-up top down view of a carrier of a chain assembly, according to one or more embodiments.
Figure 9:
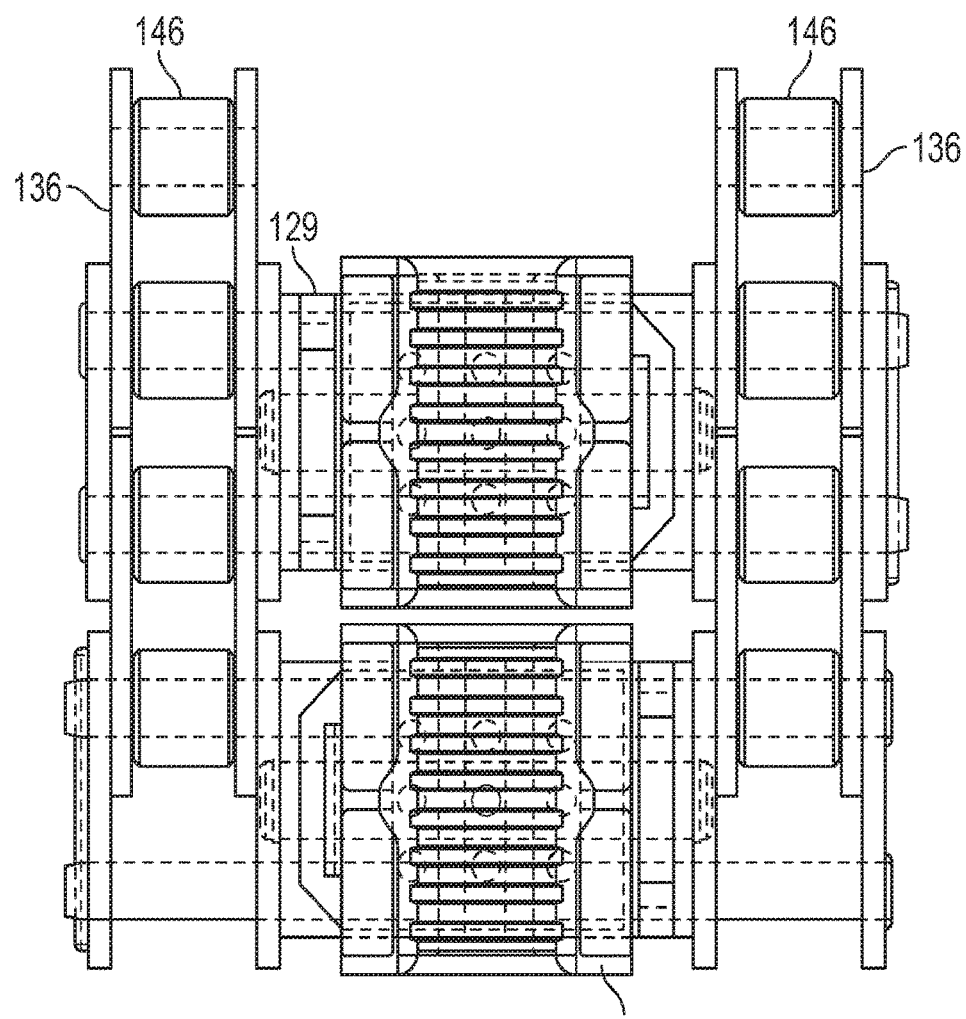
FIG. 9 is a side view of a chain assembly of an injector, according to one or more embodiments.

With reference to FIGS. 8 and 9, the chain assembly 112 may include a plurality of carriers 129 adapted for secured engagement along the chain 136. For example, the carriers 129 may be secured to a link of a chain or a joint between links of a chain. The carriers 129 may allow for interfacing with the guides 114 and the coiled tubing by including a shoe or shoes 128 on one side for engaging the coiled tubing and rollers or track followers 130 on an opposing side for engaging the guides 114. The shoes 128 may have a concave or trough shape when viewed from above and the surface of the shoes 128 may have a radiused contour adapted for engaging the radiused outer wall of the coiled tubing 104. The shoes 128 may be included with or be mounted to the carrier. As mentioned, the carrier may also include roller bearings, rollers, slides, skids, or other track followers 130 adapted to follow the guides 114. The adjustable guides may be used to press the track followers 130, carriers 129, and shoes 128 against the tubing from each side thereby gripping the tubing and allowing the chain assembly 112 to advance the tubing through the injector 106.

The carriers 129 on each side of the tubing path 118 may be substantially equally spaced along the chain 136 configured for moving them through the injector at a selected rate. In one or more embodiments, the carriers 129 may not be equally spaced. The chain assembly 112 may be driven by a drive system including a drive sprocket 140 arranged at a top of the injector and the chain assembly may pass across an idler or tension sprocket 141 at a bottom of the injector. As shown in FIGS. 8 and 9, the carriers 129 may be mounted to the chain 136 with one or more mounting rods 132 configured for engaging the chain 136 on each side thereof. That is, for example, the chain 136 may include a plurality of strands connected by pins or rods extending through the series of strands. In one or more embodiments, each chain 136 may include 2, 4, 6, or 8 strands depending on anticipated forces. Still other numbers of strands may be used.

Figure 10:
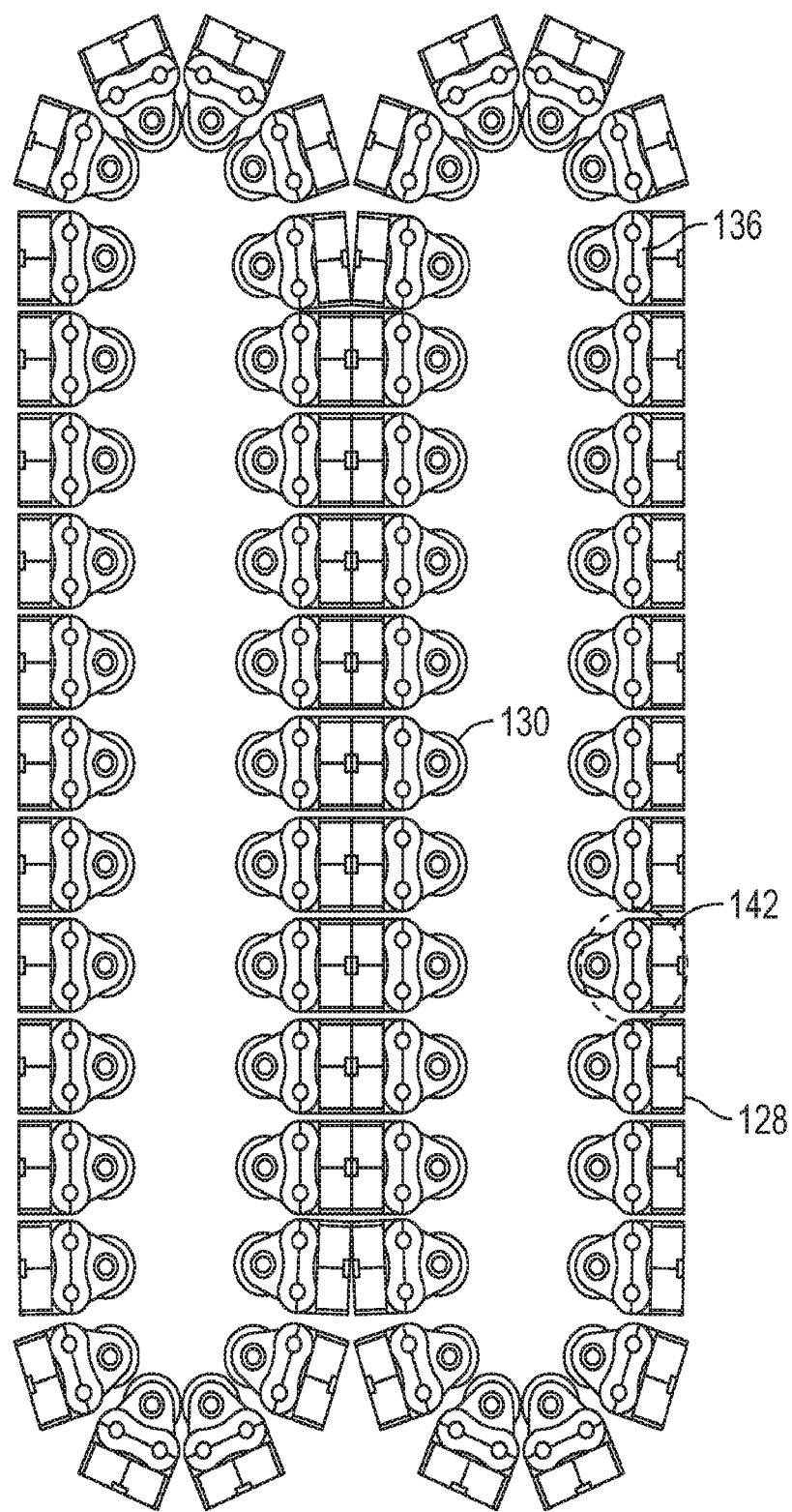
FIG. 10 is a front view of a chain assembly of an injector, according to one or more embodiments.
Figure 11:
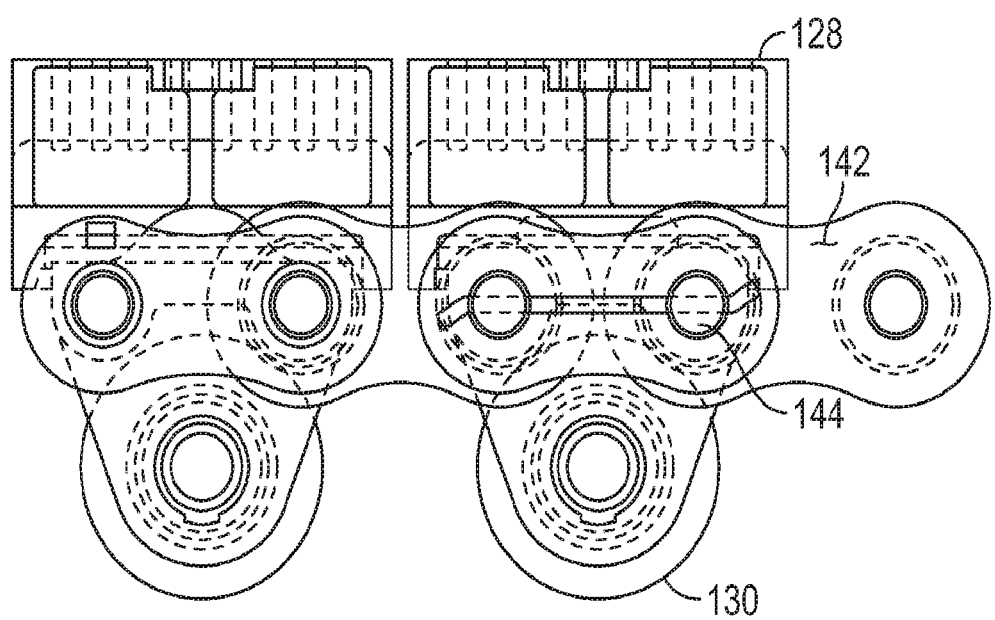
FIG. 11 is a close-up side view of a series of chain links of a chain assembly, according to one or more embodiments.
Figure 12:
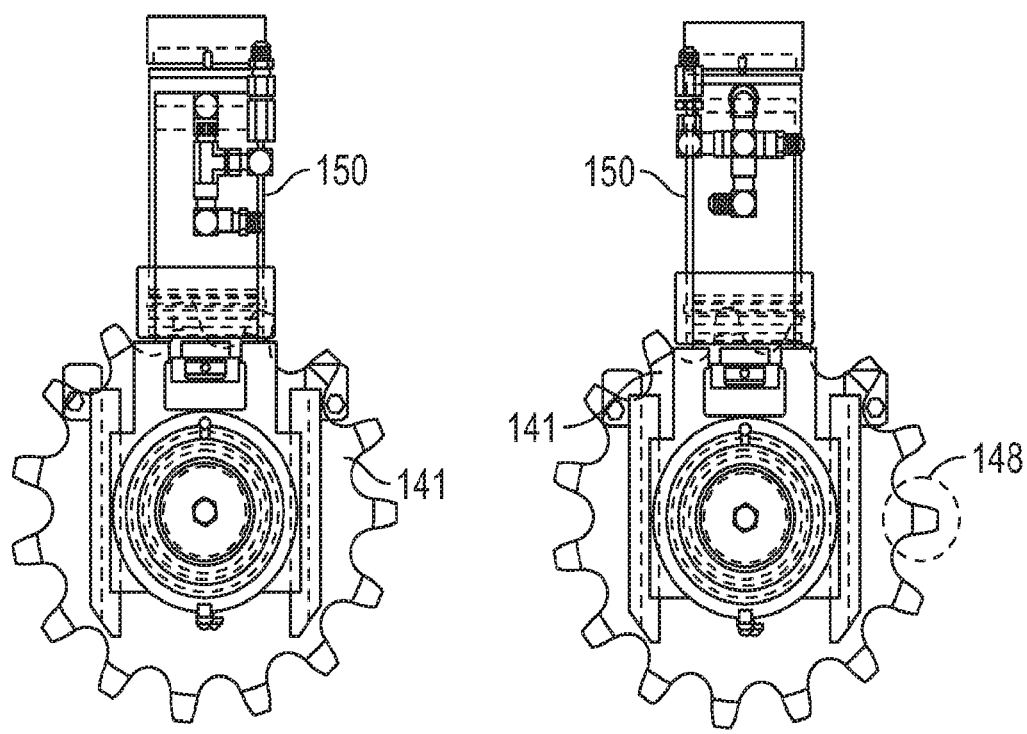
FIG. 12 is a close-up side view of a pair of sprockets of a tension system, according to one or more embodiments.
Figure 13:
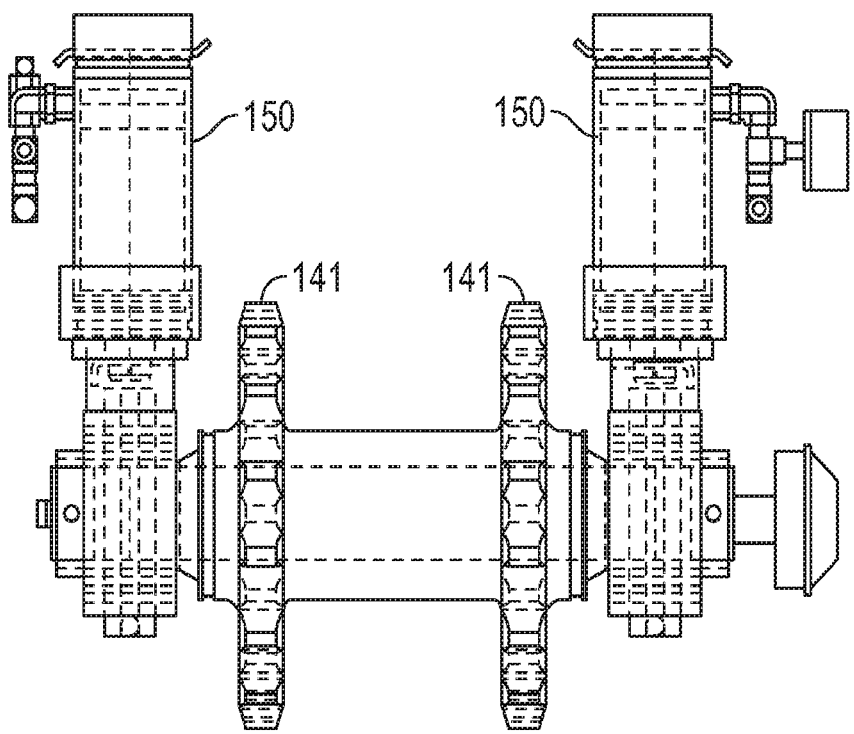
FIG. 13 is a close-up front view of a pair of sprockets of a tension system, according to one or more embodiments.

As may be appreciated, the chain 136 may include a plurality of links 142 as shown in FIG. 10 and in close up view in FIG. 11. The links 142 may be connected to one another with roller pins 144 surrounded by bushings 146 for engaging the teeth 148 of the sprockets. In one or more embodiments, the roller pins 144 and mounting rods 132 may be one in the same. That is, the roller pins 144 of the chain assembly may function to secure the carriers to the chain. The chain may engage the sprockets 140/141 at the top and bottom of the injector 106 where the teeth 148 of the sprockets 140 engage the links 142 of the chain between the pins 144 and force the motion of the chain. As shown in FIGS. 12 and 13, a pair of sprockets 141 may be provided on each side of the tubing path 118. The sprockets 141 may be arranged on an adjustable tensioner 150 allowing the sprockets 141 to move away from the opposing sprocket (i.e., the one at the other end of the chain) to maintain tension in the chain. The force applied to the tensioner 150 may be controlled and/or monitored.

Several effects may occur throughout the use of a chain. First, since the chain is being pulled to advance the coiled tubing through the injector, unequal or inconsistent tension may be induced in the chain. The tension in the chain may cause the chain to elastically stretch. Second, to manage slack in the chain, the tension system may pull on the chain system elastically stretching the entire chain. Third, and over time, the roller pins 144 and corresponding bushings 146 extending across the chain and engaging the teeth 148 on the upper and lower sprockets may experience wear. Fourth, the bearings/bushings that support the roller pins at each end where the pins engage the links and where the respective links engage each other may also wear, further increasing the "stretch" of the chain and, thus, increasing the chain's pitch (i.e., the distance from the center of one link to the center of an adjacent link). It is to be appreciated that both of these lengthening effects on the chain (i.e., elastic stretch and wear stretch) may be mitigated by increasing the distance between the upper and lower sprockets using the mentioned tensioner 150 such that the chain may avoid becoming overly loose. However, the increased chain pitch may have an effect on the performance and wear rate of the chain system and, as mentioned, overly stretched chains may be replaced.

The dynamics of sprocket/chain interactions are complicated and interrelated. When the chain pitch changes, these dynamics change, and the relationship between chain speed and rotational speed of the sprockets 140/141 may, thus, vary even though the rate at which coiled tubing 104 passing through the injector 106 is not changing. That is, the tubing 104 may be gripped by the gripping shoes 128 of the injector 106 and the shoes may be mechanically secured to the chain and the chain may mechanically engage the sprockets 140/141. Accordingly, and intuitively, one may think that the rate of the tubing 104 through the injector 106 may be consistently related to the rotational speed of the sprockets 140/141 due to their mechanical linkage. However, due to wear of the chain and, in particular, a changing pitch of the chain, the rate at which the sprockets 140/141 rotate may actually change for a given rate of tubing 104 delivery or removal. This may be because the sprocket processes 1 link of chain for each sprocket tooth 148 and if the pitch of the chain increases in length, then a larger linear footage of chain is processed as the sprocket rotates. Accordingly, the speed of the chain may change for a given sprocket speed as the pitch of the chain changes. In many circumstances, chain speed may not be readily ascertainable. However, where, and as here, the chain speed is tied to the rate at which the tubing 104 is travelling and the tubing travel may be measured, the chain speed may be determined. As such, the above-mentioned chain wear/sprocket speed phenomenon may be used to determine the discrepancy between the expected sprocket speed and the actual sprocket speed, which allows for a determination of the chain wear. This approach may allow for active monitoring of chain wear without stoppage of the machine and without physical and/or visual inspection of the chain.

Figure 14:
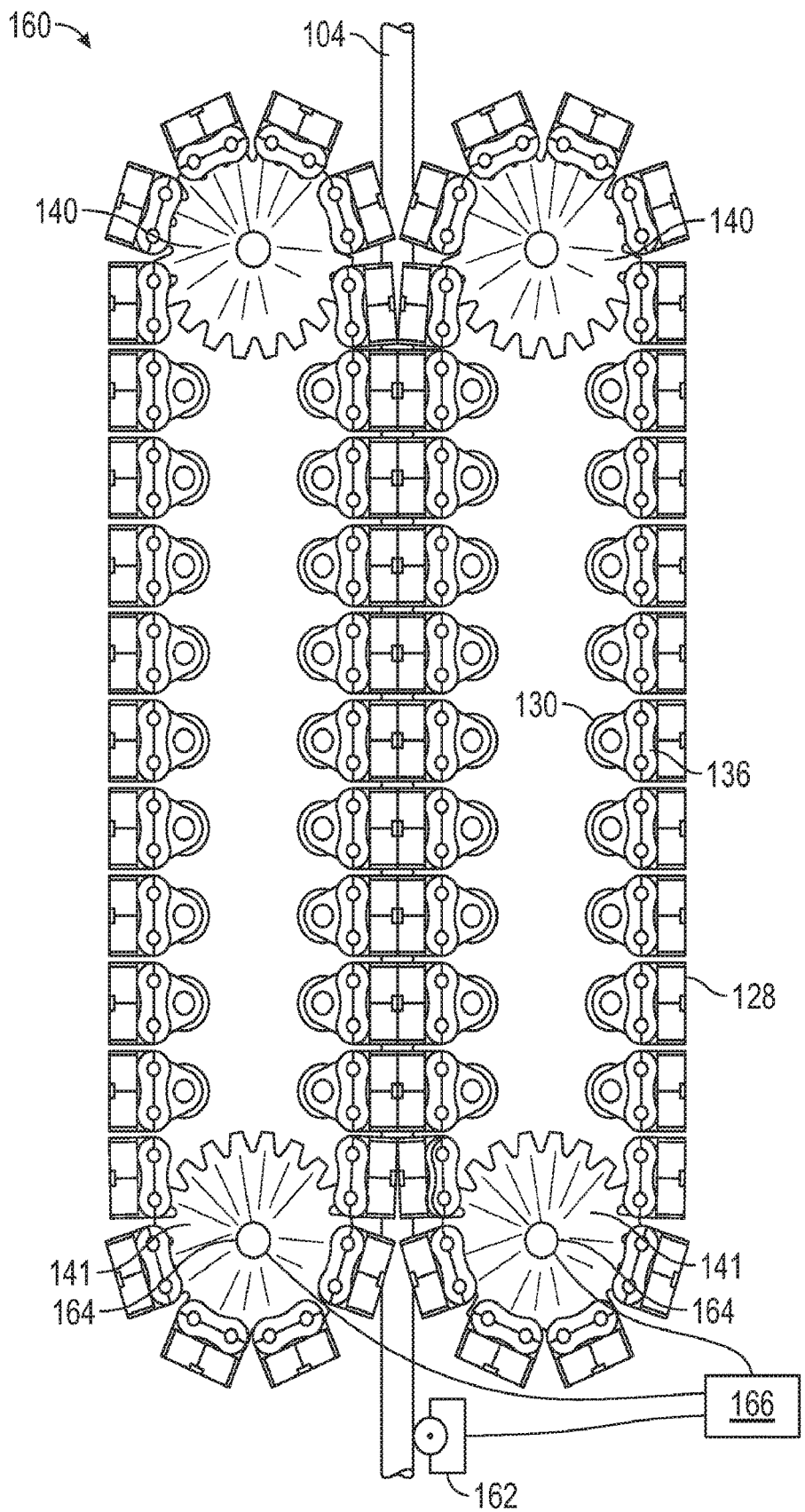
FIG. 14 is a schematic diagram of a chain wear sensing system in place on an injector, according to one or more embodiments.

A diagram of a chain wear system 160 is shown in FIG. 14. The system may be adapted to dynamically monitor wear of a chain without interrupting operation of the equipment. This dynamic approach may allow for conscious and planned decisions to be made with respect to chain maintenance and/or replacement thereby avoiding unplanned interruptions due to chain maintenance. As shown, the chain wear system 160 may include a tubing encoder or other chain monitoring device 162, a sprocket monitoring device 164, and a processing system 166.

In the context of a coiled tubing injector 106, the chain monitoring device 162 may include a tubing encoder. The tubing encoder may be adapted to measure the amount of travel of the tubing 104. In one or more embodiments, the tubing encoder may be a depth gauge used by the coiled tubing injector 106 to monitor the depth of a tool arranged on the downhole end of the coiled tubing 104. That is, by measuring the amount of tubing 104 passing through the injector 106, the depth of the tubing into a well may be determined. The encoder may include a wheel arranged to operably engage the surface of the tubing as the tubing passes into and through the injector. The wheel may rotate due to the passing tubing. The wheel may include a known diameter and, thus, a known perimeter length and the amount of rotation of the wheel may allow for determining the amount of tubing that has passed by the location of the encoder. The encoder may be biased against the surface of the tubing so as to maintain substantially constant contact with the tubing so as to consistently and accurately measure the amount of tubing passing by the encoder.

An encoder may be provided alongside the tubing to measure the linear length of tubing being injected by the injector. In one or more embodiments, rotary encoders measuring wheels on the tubing may be provided. The encoders may be mounted above or below the chain assemblies on an injector and/or on the tubing reel, for example. Still other positions of the encoders may be provided. While a rotary encoder has been mentioned, still other types of encoders may be provided such as a non-contact laser encoder, for example. One or more encoders may be provided around the perimeter of the tubing. Where discrepancies are noted between one or more encoders, particularly errant values may be ignored and other values may be averaged, for example. Still other approaches to relying on multiple encoder values may be used.

While the chain monitoring device 162 has been described as including an encoder mechanically engaged with the tubing, most any device capable of monitoring the speed of the chain may be used so long as it takes into account, the chain stretch. For example, in one or more embodiments, within or outside the context of a coiled tubing injector, the chain monitoring device may include a tangentially arranged idler sprocket configured and arranged to measure chain speed. That is, where the sprocket is tangentially arranged, the sinusoidal complications of a chain wrapping on a sprocket may not be present and the sprocket may be used in a manner consistent with an encoder wheel such that the idler sprocket may measure a distance of chain travelled over time. In one or more other embodiments, a sensor adapted to sense a feature of the chain and determine its speed may be used. For example, a chip, RFID, or other sensible feature may be built into the chain and a corresponding sensor or sensors may sense the position of the sensible feature over time allowing for the speed of the sensible feature to be determined. For purposes of accommodating any "slinky" effect of the chain, multiple sensible features may be used and multiple inputs may be used and averaged to get an accurate rate of travel for the chain.

The sprocket monitoring device 164 may be configured for monitoring the rotational speed of the sprocket and/or the rotational amount of the sprocket. In one or more embodiments, a rotary encoder may be mounted directly on a tension or drive sprocket or the shaft of the tension or drive sprocket, as shown, to monitor the rotation of the sprocket. Additionally or alternatively, the sprocket monitoring device may include an eye or other sensor for sensing a passing mark, line, or other indicator fixed to the sprocket. The mark, line, or other indicator may include a single indicator or multiple indicators may be provided on the sprocket allowing for more particular and/or precise sensing of the sprocket motion. In other embodiments, the sprocket may include a wheel parallel to the sprocket and adjacent the sprocket and an encoder wheel may be used with the mounted wheel to assess sprocket rotation. In still other embodiments, an encoder wheel may be arranged perpendicular to the surface of the sprocket and the wheel may be placed at a particular radius away from the center. As such, the speed of the encoder wheel may be used to assess the rotational speed of the sprocket.

As discussed in more detail below, the speed of the sprocket may be used to determine the number of teeth per unit time of the rotating sprocket, which may be used to determine the number of chain pitches being processed. As such, while a sprocket monitoring device has been described, still other approaches to determining the number of chain pitches being processed may be used. That is, the sprocket monitoring device may be one form of a pitch counter where a pitch counter is a device for counting chain pitches. In one or more embodiments, and as an addition or alternative to a sprocket monitoring device, a pitch counter may include a light, laser, or sound based device for identifying the difference between cross members in the chain and sprocket teeth windows in the chain. For example, a light or laser may be mounted on one side of a chain and a sensor on an opposite side may sense the light from the laser or light, thus, identifying a chain pitch each time it senses the light. Still other approaches to counting chain pitches may be used.

The processing system 166 may include a computing device adapted to receive input from the chain monitoring device 162 and the sprocket monitoring device 164 (or pitch counter as the case may be), assess the wear condition of the chain, and provide output to a user regarding the wear condition. The processing system 166 may be in signal communication with the chain monitoring device and the sprocket monitoring device. In one or more embodiments, the signal communication may be provided by a wired connection as shown in FIG. 14 or a wireless communication may be used. The processing system may include a computing device having a computer readable storage medium with instructions stored thereon for computing an amount of chain wear. The storage medium may also be adapted for storing long term data for averaging or logging. The computing device may also include a processor for processing the instructions to calculate an amount of chain wear. The computing device may also have a communication system for communicating with one or more sensors, and an output system. In one or more embodiments, the processing system 166 may be built into other aspects of the coiled tubing unit 100 and may include a software or hardware module incorporated into a computing system 138 for operating the coiled tubing unit and/or injector thereof.

More particularly, the processing system 166 may receive input from the chain monitoring device 162 including length of tubing per unit time and may receive input from the sprocket monitoring device 164 (or pitch counter) including teeth per unit time (or pitches per unit time). With this information, the processing system may calculate the amount of chain wear as detailed below. That is, while the rate of rotation of the sprocket may change slightly as the chain wears and chain stretch occurs, it remains that the number of teeth corresponds to the number of chain pitches passing around the sprocket. That is, unless the chain jumps the teeth, each tooth on the sprocket will engage a consecutive pitch of the chain. The number of teeth on the sprocket is known (i.e., commonly 15 teeth or 19 teeth for coiled tubing injectors) and it is constant. As such, any fraction of rotation of the sprocket may allow for calculating the number of teeth or fractions of teeth for a given amount of time. For example, if the sprocket rotates 2½ times per second, that would be equal to 37½ teeth for a 15-tooth sprocket and 47½ teeth for a 19-tooth sprocket. If the number of teeth is known, that is the same as the number chain pitches that have passed around the sprocket and, as such, the sprocket monitoring device may be used to count pitches per unit time. Alternatively, these pitches may be counted directly by a pitch counter, for example. In either case, by comparing the length of tubing per unit time to the number of pitches (or fractions thereof) per unit time, the system can calculate the pitch length. For example, for any given amount of time:

(Measured Length of tubing or length of chain)/(# of Pitches turned by the sprocket or number of pitches counted)=Pitch Length.

It remains that during use, the chain may be under tension and, as such, some portion of the extended pitch length may be due to elastic stretch. The amount of stretch of the chain may include an elastic amount of stretch which means it may be proportional to the modulus of elasticity of the chain material. As such, with knowledge of the chain material, the tension on the chain, and the cross-sectional area of the chain, the amount of elongation under load may be determined using one or more forms of the following equation adapted to be applicable to the chain geometry:

$\Delta = PL/AE$, where:

P=tension in the chain
L=length of chain under consideration
A=cross-sectional area of chain
E=modulus of elasticity of the chain material In the context of a coiled tubing injector, one or more of the sprockets may include a chain tensioning mechanism 150 that forces the sprocket 141 away from an opposing sprocket to maintain tension on the chain. The amount of tension in the chain may be determined based on the amount of force being applied by the chain tensioning mechanism. Additionally, or alternatively, the tension in the chain may be derived or sensed via a strain gauge or other device. Still other approaches including the torque on the sprockets may be used or factored into the tension applied to the chain or load sensors on the injector as a whole may be used. In one or more embodiments, adjustments may also be made for chains that do not have a constant cross-section over the applicable length. For example, in one or more embodiments, a finite element model may be used to assess the stretch due to tension on the chain.

With knowledge of the amount of stretch that is due to tension, the calculated pitch length that was based on tubing length and chain pitches may be adjusted (i.e., reduced) by the momentary amount of stretch due to tension. As such, the amount of stretch due to wear alone may be determined. It may be appreciated that the amount of stretch in the chain due to tension may be relatively small and, in one or more embodiments, this stretch may be ignored. The calculated amount of stretch due to wear may be the same or very close to the amount of stretch that would be measured if the chain were to be removed and measured or if it were measured in situ, but not under load. However, the machine may continue to operate as the system monitors chain wear.

One or more regulations in the coiled tubing context or other contexts may provide limits on the amount of stretch allowed before a chain may be replaced. In some cases, the amount of stretch due to wear may be limited to 1% to 5% or 2% to 4%, or 3%, for example. As such, the pitch length determined may be compared to the starting pitch length to determine the percentage change in pitch length. Where the percentage change is some fraction of the allowed amount, maintenance and/or replacement plans may be made based on how long the chain has been in service and based on the conditions under which it has been operating. However, where the change is closer to the allowed amount, more immediate plans to replace the chain may be made. The system may be used to monitor the chain wear on an ongoing basis to avoid surprises and continually or periodically assess when and/or if the chain needs to be maintained or replaced. Still further, the measurement of chain wear over time may be used to assess effects of particular operation on chain wear and to assess improvements in chain system maintenance to optimize chain life span. In one or more embodiments, the system may include a warning system for identifying particular conditions. For example, thresholds or preset limits may include limits on total stretch, increasing wear rate, or other limits.

It is to be appreciated that the same or similar equations and approach may be used in other contexts. That is, rather than measuring the length of tubing in a given amount of time, the actual chain length may be measured and divided by the number of pitches turned by the sprocket.

Figure 15:
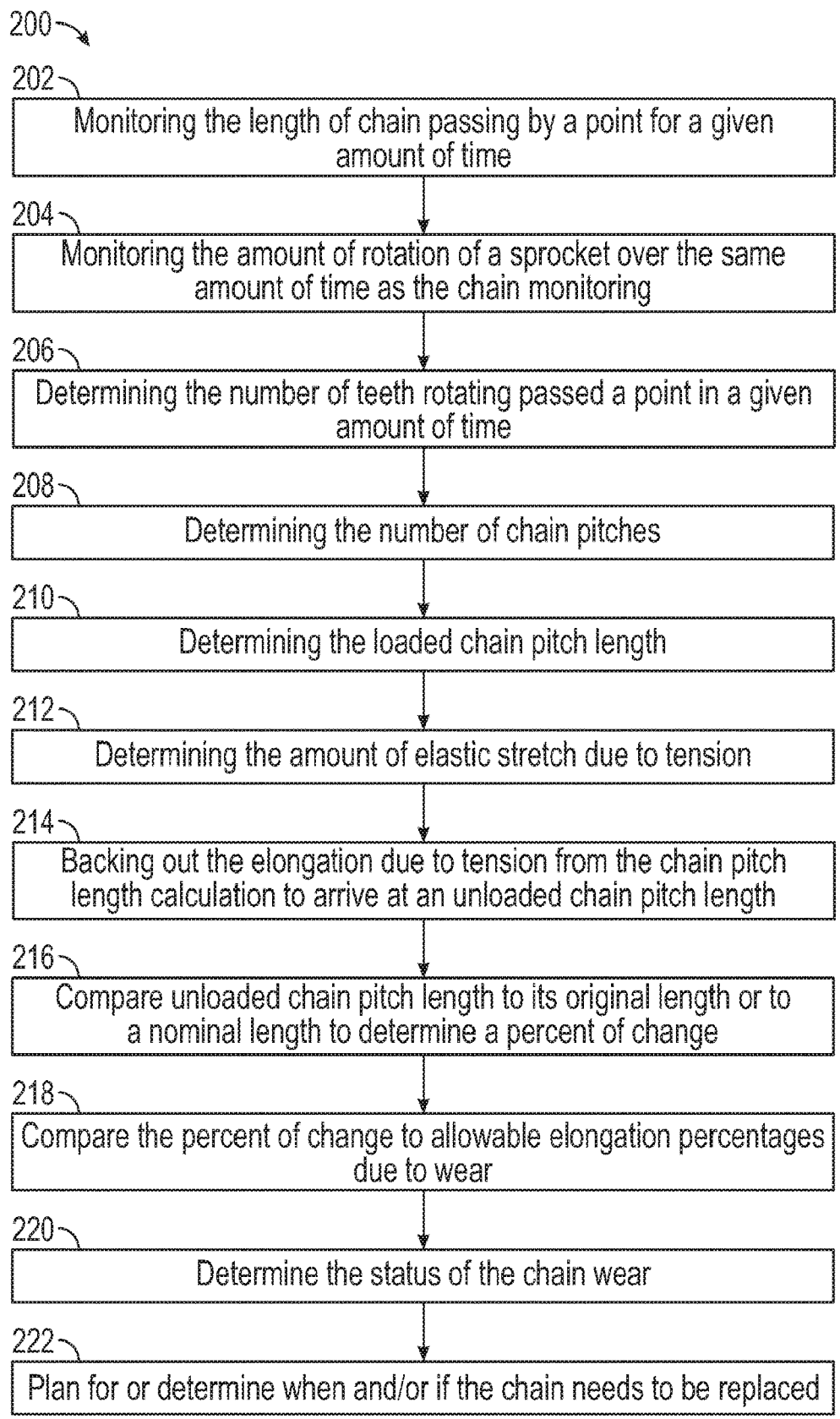
FIG. 15 is a flow chart showing a method of monitoring chain wear, according to one or more embodiments.

In operation, a method (200) of monitoring chain wear may include several steps as shown in FIG. 15. The method (200) may include monitoring the length of chain passing by a point for a given amount of time (202). As described in detail above, this may include measuring the corresponding length of tubing passing by a point or it may include measuring the length of chain more directly. The method may also include monitoring the amount of rotation of a sprocket over the same amount of time as the chain monitoring or the number of pitches of chain may be measured more directly (204). In the case of measuring sprocket rotation over time, the amount of sprocket rotation may be used to determine the number of teeth rotating passed a point in a given amount of time (206). The method may also include determining the number of chain pitches (208). The number of teeth from the sprocket monitoring may be used to identify the number of chain pitches by selecting a number of chain pitches equal to the number of teeth. The method may also include determining the loaded chain pitch length (210). With the length of chain and the number of chain pitches in a given amount of time, the length of the chain pitches may be determined by dividing the length by the number of pitches. The method may also include determining the amount of elastic stretch due to tension (212). Here, the tension in the chain may be determined based on the force being applied by the chain tensioner, for example, or information from a strain gauge may be used. Alternatively, or additionally, the torque on the sprocket may be used. The amount of elastic stretch in the chain may be determined using elongation equations based on tension, length of chain, cross-sectional area, modulus of elasticity, stress analysis, or mechanical testing. The method may also include backing out the elongation due to tension from the chain pitch length calculation to arrive at an unloaded or relaxed chain pitch length (214). The loaded or unloaded chain pitch length may be compared to its original or nominal length to determine a percent of change (216). The percent of change may be compared to allowable elongation percentages due to wear (218) to determine the status of the chain wear (220) and to plan for or determine when and/or if the chain needs to be replaced (222).

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A chain wear system for monitoring an amount of wear of a chain operating on a plurality of sprockets, comprising:
   a chain monitoring device configured for determining a length of the chain passing by a point in an amount of time;
   a sprocket monitoring device configured for determining the amount of sprocket rotation of at least one of the plurality of sprockets in the amount of time; and
   a processing system in signal communication with the chain monitoring device and the sprocket monitoring device and configured for determining a number of teeth based on the amount of sprocket rotation and calculating the amount of wear based on the length of the chain and the amount of sprocket rotation.

2. The system of claim 1, wherein the chain monitoring device is part of a coiled tubing injector and the chain monitoring device is arranged and configured to monitor an amount of travel of the coiled tubing.

3. The system of claim 2, wherein the chain monitoring device is an encoder arranged against the coiled tubing.

4. The system of claim 1, wherein the processing system is configured to equate the number of chain pitches to the number of teeth and divide the length of chain by the number of chain pitches to arrive at a chain pitch length.

5. The system of claim 4, wherein the processing system is further configured to back out an amount of chain stretch due to chain tension to arrive at a relaxed chain pitch length.

6. The system of claim 5, wherein the processing system is configured to compare the relaxed chain pitch length to a nominal chain pitch length and to calculate an amount of chain stretch.

7. The system of claim 6, wherein the processing system is configured to display the amount of chain stretch as a percentage of the nominal chain pitch length.

8. The system of claim 7, wherein the processing system includes preset limits and issues warnings when preset limits are reached.

9. The system of claim 8, wherein the preset limits include chain stretch.

10. The system of claim 8, wherein the preset limits include increasing wear rate.

11. A chain wear system for monitoring an amount of wear of a chain operating on a plurality of sprockets, comprising:
    a chain monitoring device configured for determining a length of the chain passing by a point in an amount of time;
    a pitch counter configured for determining a number of pitches passing by a point in the amount of time; and
    a processing system in signal communication with the chain monitoring device and the pitch counter and configured to determine a number of teeth based on the amount of sprocket rotation and for calculating the amount of wear based on the length of the chain and the number of pitches.

12. A coiled tubing unit, comprising:
    a transportation vehicle with a tubing spool containing coiled tubing; and
    a coiled tubing injector configured for pulling the coiled tubing from the spool and injecting it into a well, the coiled tubing injector having a driven chain assembly,
    wherein, the coiled tubing injector is equipped with a chain wear system configured to dynamically determine an amount of chain wear during operation of the coiled tubing injector, the chain wear system comprising:
    a chain monitoring device comprising an encoder arranged against the coiled tubing, the chain monitoring device configured to monitor an amount of travel of the coiled tubing and determine a length of the chain passing by a point in an amount of time;
    a pitch counter comprising a sprocket monitoring device and configured for determining a number of chain pitches passing by a point in the amount of time; and
    a processing system in signal communication with the chain monitoring device and the sprocket monitoring device and configured to determine a number of teeth based on an amount of sprocket rotation and to equate the number teeth to the of chain pitches for calculating the amount of wear based on the length of the chain and the number of chain pitches.

13. A method for dynamically determining an amount of wear of a chain, comprising:
    determining a length of chain passing by a point in an amount of time;
    determining an amount of sprocket rotation in the amount of time;
    calculating a number of teeth based on the amount of sprocket rotation; and
    calculating the amount of wear based on the length of chain and amount of sprocket rotation.

14. The method of claim 13, further comprising, equating the number of teeth to the number of chain pitches.

15. The method of claim 14, further comprising, determining a loaded chain pitch length by dividing the length of chain by the number of chain pitches.

16. The method of claim 15, further comprising, backing out an amount of chain stretch due to tension to arrive at a relaxed chain pitch length.

17. The method of claim 16, further comprising, determining an amount of chain stretch as a percentage of a nominal chain pitch length.

18. The method of claim 13, further comprising, assessing improvements in chain system maintenance based on chain wear measurements over time.

* * * * *